United States Patent [19]

McLaughlin

[11] 4,058,393

[45] Nov. 15, 1977

[54] PROCESS FOR THE BENEFICIATION OF TITANIFEROUS ORES

[75] Inventor: Robert Joseph William McLaughlin, Alphington, Australia

[73] Assignee: The University of Melbourne, Victoria, Australia

[21] Appl. No.: 589,129

[22] Filed: June 23, 1975

[30] Foreign Application Priority Data

June 21, 1974 Australia ............................. 7920/74

[51] Int. Cl.$^2$ ............................................. C22B 3/00
[52] U.S. Cl. ........................................ 75/1 T; 75/121; 106/299; 106/300; 423/84; 423/86
[58] Field of Search ..................... 75/1 R, 1 T, 2, 121, 75/111; 423/85, 86, 84, 140, 147, 462, 472, 492, 611, 612, 613; 106/300, 299

[56] References Cited

U.S. PATENT DOCUMENTS

| 2,113,946 | 4/1938 | Plechner | 423/612 |
|---|---|---|---|
| 2,333,663 | 11/1943 | McCord | 423/612 |
| 2,576,483 | 11/1951 | Shultz | 106/300 |
| 2,622,964 | 12/1952 | Aagaard | 423/611 |
| 2,694,617 | 11/1954 | Cardon | 423/84 |
| 2,812,237 | 11/1957 | Wainer | 423/84 |
| 3,167,516 | 1/1965 | Brayton | 423/84 |
| 3,660,078 | 5/1972 | Yamada | 75/108 |

*Primary Examiner*—L. Dewayne Rutledge
*Assistant Examiner*—Michael L. Lewis
*Attorney, Agent, or Firm*—Cushman, Darby & Cushman

[57] ABSTRACT

The invention relates to the beneficiation of both natural and artificial titaniferous ores, specifically ilmenites by adding to the ores a fluoride, preferably a normally insoluble fluoride in an amount such that the percentage of fluorine ion relative to the titania values lies between 13% and 50%, adding to the mixture hydrochloric acid, the fluorine ions acting as an activating agent. After dissolution, the titanium is precipitated out, as a mixture of titanium dioxide, titanium oxy hydroxy fluoride and titanium oxy fluoride, the iron values largely remaining in solution.

19 Claims, No Drawings

PROCESS FOR THE BENEFICIATION OF TITANIFEROUS ORES

This invention relates to a process for the beneficiation of titaniferous ores and slags or other artificially made material having a titanium content which will for simplicity be referred to herein as ores, and is particularly suitable for beneficiation of ores which include both titanium and iron and, specifically, to ores which contain these elements with the iron mainly in the ferrous form, such as the ilmenites which are nominally ferrous titanate ($FeTiO_3$) which, if pure, have a theoretical titanium dioxide ($TiO_2$) content of 52.66% but which in practice may contain substantially less than this theoretical amount but also may contain substantially more than the theoretical amount. This range, at its lower end, reflects the presence of other elements or minerals within the ilmenite and also different crystal structures, e.g. titanomagnetite and its upper end may reflect the weathering of the iron oxides from the ore or admixtures of constituents having high titania content. It will be appreciated that as found in nature, ilmenites may vary greatly in composition and this invention is applicable to the various forms of iron titanates as well as artificially made materials having a titanium content.

At the present time the use of titanium salts, specifically titanium dioxide, and titanium metal is increasing rapidly throughout the world. For many years, the main use of titanium has been the use of the oxide as a pigment or in the paper industry but more recently the use of titanium dioxide, for example in the steel industry, has been expanding.

Titanium is a relatively common element and the main source of commercial titanium has been from rutile which contains approximately 95% of titania (titanium dioxide) but because of the increased usage the available rutile deposits are proving insufficient and a great deal of work is being done in upgrading other titaniferous ores. Many of the previously proposed processes are discussed in "A Review of Proposed Processes for Making Rutile Substitutes" by John J. Henn and James A. Barclay which was published in 1970 by the United States Department of the Interior, and specifically, the Bureau of Mines.

This paper discusses some 10 different major types of processes with subdivisions which all have certain disadvantages in that they are relatively expensive to operate and thus the titanium dioxide can only be obtained relatively expensively, either because the reactants used are expensive or, more generally, because reactions are effected at high temperatures, often at high pressures, and also often for long periods.

A specific object of the invention is to provide a method of beneficiation of titaniferous ores wich process has economic advantages over previous processes as high temperatures and pressures are not necessary and the reactants used are either cheap or can be recycled.

In one aspect of the invention, we provide a process for the beneficiation of titaniferous ores, as herein defined, including treating the ore mixed together with fluoride ions with hydrochloric acid.

We prefer that the source of the fluoride ion is from a normally insoluble fluoride and the acid be dilute, normally less than 25%.

Preferably, the fluoride is naturally occurring calcium fluoride. The naturally occurring material has obvious economic advantages over an artificially produced material, where it is available, but the invention can still be economically viable using commercially produced fluoride. The fluoride concentration related to the titania values in the ore can very widely but we find most satisfactory results between 13% and 50% and preferably between 20% and 40%.

We believe that the fluoride apparently acts as an activating agent which reacts with the sheath of titania produced on the surface of the ore to thereby remove this sheath and to ensure that reaction is not retarded by such a sheath remaining on the surface.

More particularly, because the titania sheath is removed from the ore surface by the activating agent we have found that it is not necessary to operate at elevated pressures and high temperature, as is normally done in an autoclave but good results can be obtained by operations at atmospheric pressure and at temperatures not higher than the atmospheric boiling point of the acid. We have, however, found that the continuous release of fluoride ions prevents precipitation of titanium values so that even at boiling point there is relatively little precipitation, provided there are no nucleating agents, for example insoluble ferric oxides present. Thus, it is possible to operate our process over a wide range of temperatures, the selected temperatures being dependent on the yield as compared to the cost of maintaining the temperature. As we will describe hereinafter, an hydrochloric acid recovery process may be, and preferably is used in association with the invention and we may use acid directly from this recovery process, which may initially be at or close to boiling temperature. During the reaction, it may be desirable to maintain this temperature or it may be possible to permit the temperature to drop during digestion.

We have found that if the naturally occuring ilmenite or other titaniferous iron ore has its iron predominantly in the ferrous state with any ferric iron largely in solid solution, which is often the case, such ore may, under certain conditions, be soluble in acids, such as hydrochloric acid. However, as the digestion continues, and the acid becomes diluted because of this reaction, there can be hydrolysis of the titania and, in this way, an oxide sheath is formed on the surface of the particles. Thus, unless a considerable excess of acid is used, to maintain the acidity of the reaction vessel, the reaction will cease. The literature shows that in most cases an excess of hydrochloric acid is used, and even so, in many cases, for good results the reaction must be carried out at an elevated temperature and pressure.

We have found that the rate of reaction using the process of our invention can be increased by rapid agitation or working, such as grinding.

After digestion has been completed, and we find that under most circumstances a one hour digestion is satisfactory, the solution may be clarified by any standard method, and we have found filtering, settlement, or centrifuging satisfactory. The purpose of clarification is to remove residual material which has not been dissolved by the acid, such as excess calcium fluoride, inclusions of other minerals in the ore and also minerals, which may include titanium values, which are unreactive under the conditions outlined.

In order to precipitate the titanium values from the acid solution which remains after settlement, we may use one of two methods. In the first, the acid volume is reduced, normally by boiling the material or spray drying. The acid liberated during evaporation can be collected and together with that remaining after precipitation can be reclaimed in an acid regeneration plant and, at the same time, the dissolved iron chloride can be recovered from the plant as iron oxide.

Alternatively, a precipitate seed may be formed by the addition of part of the liquid to boiling water and the remainder of the liquid can be added so that the titanium values precipitate out. Alternatively, the seed may be added to the main solution to give good results. The filtered liquid can, again, pass to an acid regeneration plant.

The precipitate obtained will contain more or less iron oxide depending upon the degree of drying and the method of precipitation. The reduction of the acid volume must be controlled so that during precipitation the titanium values are separated as effectively as possible and so the iron chlorides are not hydrolyzed and precipitated as iron oxides. It is preferred to retain the iron chlorides in solution for recovery of the iron values as will be described hereinafter. If the filtrate is completely dried, then effectively the whole of the iron and other constituents will also be precipitated as a complex mixture but will be relatively acid soluble.

We have found that where the first method of precipitation is used there is a relatively high calcium content but a low iron content in the precipitate and in the second method, there is a low calcium content and a high iron content. The first method gives a product which is suitable for further processing by a sulphate plant and the second method for a chloride process which can tolerate iron but very little calcium.

Any iron oxide which has precipitated can be dissolved by using hydrochloric acid of a concentration selected so that the titania will not be dissolved to any great extent. This operation is well known in the art. The acid used can then also be passed to the recovery plant.

If we then again filter this material, we are left a high grade titanium dioxide and the filtrate is mainly iron chloride in hydrochloric acid with, provided optimum conditions have been selected, a minimum of titanium values present.

The titanium dioxide formed is satisfactory for many uses and can be of pigment grade but if required for further upgrading, this, as indicated previously, may be done by standard methods of purifying titanium dioxide.

The filtrate which contains the acid and iron salt and any other acid obtained, is treated by an acid recovery process, (Aman, Woodhall Duckham, Lurgi, etc.) to recover the hydrochloric acid and the iron, in the form of iron oxide.

The ferric oxide resulting from the acid recovery process, may be used as high grade pigment, or, if required, as a high grade feed for the production of iron metal. For example, the oxide is reducible to iron metal by a variety of reductants, including gases, and the resultant final material can be an agglomerate of pure iron which is usable in industries.

Alternatively, the dried filtrate could be treated with hydrogen to provide direct production of iron metal and hydrochloric acid.

Before considering results of the use of the invention on particular titaniferous materials under specific conditions, we shall describe, generally, two methods of applying the invention to plant scale operations.

The invention can be carried out in a batch process and in such a process, titaniferous feed, which we will refer to generally as ilmenite, can be added to a digester which can be either an agitated reaction vessel or the like or can be a rotating drum.

The feed may be treated before addition to remove undesirable particles such as dirt, from the grain surface, or not, depending upon the purity of the feed and the grade of end product required. Also, if required, the feed may go through a grinding process prior to being fed to the digester and such grinding process may either be a wet or dry grinding.

If grinding is to be effected, we prefer to use dry grinding as in this way the digestion acid concentration is not diminished by the amount of water which could be carried through from a wet grinding process.

Because we use relatively dilute acid of the order of Constant Boiling Point and normally no more than 25% acid and normally temperatures no greater than the atmospheric boiling point, as will be described hereinafter, the materials of construction of the digester will not be as critical as would be the case if more concentrated acids and higher temperatures were to be used.

One preferred form of construction is to use a lining of a resistant plastics materials, such as polytetrafluoroethylene or other non-reactive plastics material. Alternatively, a lining of natural rubber is satisfactory. Added to the digester with the feed is calcium fluoride which may be in the form of natural rock and we have found that this material does not have to be finely ground and a grain size of the order of less than 30 mesh is quite satisfactory. The material may be of low grade and still give satisfactory results. To the digester is added hydrochloric acid which may preferably be relatively dilute acid, that is having a concentration of under 25% (W/V). Practically, the preferred acid concentration is between 20% and 25% and for convenience we may use constant boiling point acid (20.2%) which is the concentration which is normally obtained from conventional acid regeneration plants but for improved results acid having a concentration of approximately 25% may be desirable. Higher concentrations could be used but we do not believe that they would be as economically desirable. Also, acid from a reconstitution plant may be approximately at boiling point. In order to minimize the energy required to maintain the required temperature, the acid fed to the digester may be obtained directly from an acid regeneration plant and thus the acid may initially be at the required maximum temperature and thus it is only necessary to maintain the temperature. As the acid tends to cool, it may be treated to retain its temperature or satisfactory results may be obtained with a reduction of acid temperature. We find that the rate of dissolution of the ilmenite is very much greater than one would have expected by simple use of the acid and we believe that this is mainly because the fluoride ions from the calcium fluoride tend to complex with the titanium values so that these go rapidly into solution leaving a fresh surface for acid attack, and that a portion of the fluoride ions may return to the solution to again complex with further titanium ions.

We have also noted that whereas a normal treatment of calcium fluoride with dilute hydrochloric acid would lead to a dissolution of the calcium fluoride in, say, one hour of less than 0.5 percent, the dissolution of this material when associated with an ore, as defined, is very much greater.

The dissolution of the ilmenite under various conditions can be seen from examination of the following table. The ilmenite, which was from Wharekawa Coromandel Penninsula, New Zealand, had the following analysis:

FeO - 34.63 ; $Fe_2O_3$ - 13.6 ; $TiO_2$ - 46.51

$Cr_2O_3$ - 0.04 ; MnO - 1.18 ; MgO - 2.10

$Al_2O_3$ - 0.47 ; others - 1.44.

The weight of ilmenite and acid volumes were constant and there were variations of the acid concentration and the amount of added calcium fluoride. In all cases, the heating was given a one hour period.

TABLE I

| No. | Wgt.Taken (g) | H Cl Acid volume (ml) | Concn. (%) | Addition | Dissolved (%) | |
|---|---|---|---|---|---|---|
| 1 | 250 | 2500 | 20 | — | 19.7 | |
| 2 | " | " | " | 20g Ca $F_2$ | 40.0 | |
| 3 | " | " | " | 60g Ca $F_2$ | 53.2 | |
| 4 | " | " | " | 60g Ca $F_2$ | 46.8 | (75-85° C) |
| 5 | " | " | 25 | 60g Ca $F_2$ | 79.6 | |
| 6 | " | " | " | 60g Ca $F_2$ | 81.6 | fresh ground |
| 7 | " | " | 20 | 50ml 40% HF | 49.2 | |

In all experiments, the materials were stirred and, except in Experiment 4, the mixtures were boiled (approximately 109° C). In Experiment 4, the temperature was maintained at approximately 76° C.

It can be seen, from Experiment 1 that if no calcium fluoride is added, the percentage dissolved is low. As the fluoride content increased, the percentage dissolved increases remarkably and on acid concentration increase there is an increase in the percentage dissolved. In Experiment 6, the ilmenite was more finely ground and this also increases dissolution. In Experiment 7, there is a relatively high dissolution but normally the use of HF is undesirable as the HF/HCl mixture is extremely corrosive as the materials of construction of the reaction vessel are critical and we have found that as there is no continuous addition of fluoride ions to the reaction vessel, the reaction slows down after a time. If HF is recovered from the process, as will be described hereinafter, it may be feasible to recycle the acid.

The reaction can take place over a wide range of temperatures and the temperature selected will depend on the cost of maintaining the temperature relative to the increased yield. Set out hereunder is a table showing dissolution percentages:

TABLE II

Mercury Bay, Coromandel, Least Magnetic fraction of magnetics 25g<325 mesh ilmenite/ 250ml 25% H Cl/ 4.64g Ca $F_2$ (coarse ground) 1 hour at Temperature indicated.

| T° C. | | % Dissolved |
|---|---|---|
| 55 | | 30 |
| 65 | | 44.4 |
| 75 | | 62.0 |
| 85 | | 66.0 |
| 95 | | 74.4 |
| 109 | (Boiling) | 75.2 |

We have found that at the top of the ranges of acid concentration and temperatures, there is only a minor tendency for precipitation of the titanium values. Previously, as soon as temperatures were increased, precipitation has tended to occur.

After a predetermined period, say one hour, the liquor is removed from the remaining feed material and any calcium fluoride and is passed to a clarification plant which may be of conventional form. Specifically, the clarification plant can either be in the form of settlement tanks or can be a filter process or can be a centrifuge or other method. In this clarification plant, all unwanted solid and slimes are removed from the liquor and the larger solids may be returned for further digestion.

The liquor then passes for hydrolysis. Hydrolysis may be effected in one of two ways. Firstly, if the solution is concentrated, as by evaporation or spray drying, there will be a spontaneous precipitation of the titanium values as a mixture of titanium dioxide, titanium oxy fluoride and titanium oxy hydroxy fluorides, which are non-stoichiometric with the amount of the various constituents depending on the precipitation conditions. At or near dryness, addition of water will cause the major portion of the titanium and the fluoride to precipitate whilst the iron and other constituents remain soluble. Alternatively, a small part of the mixture can be added to boiling water at which time a precipitate starts to appear and if then the remainder of the liquor is added, the initial precipitate acts as a seed and further precipitation is achieved. Alternatively, a seed can be added to the body of the solution. When precipitation has been completed, the precipitate can be removed from the motor liquor by filtration or centrifuging and the liquor is passed for regeneration.

TABLE III

An analysis of typical precipitates is:

| Method | CaO% | MgO% | $Fe_2O_3$%* | F% | Ign. Loss % |
|---|---|---|---|---|---|
| Evaporation | 1.4 | 0.3 | 0.16 | 12.3 | 18.6 |
| Boiling Water Seed | 0.02 | 0.0 | 1.31 | 6.2 | 12.8 |

*determined as ferric iron

The evaporation method gives a CaO and MgO percentage which are substantially higher than those of the Boiling Water Seed method but substantially less $Fe_2O_3$. The product of the evaporation method is suitable as a feed for sulphate processing and the boiling water seed for chloride processes for titania pigment production. The table also shows a variation in the loss on ignition. The ignition loss figure given is not simply equivalent to the loss of the water and the fluorine as the fluoride ions are replaced by oxygen and, as one oxygen atom replaces two fluoride ions, there is approximately twice as much fluorine liberated as would be indicated by the portion of the ignition loss due to fluorine.

The filter cake may be further processed as will be described hereinafter.

We have found that the precipitate formed by the process of the invention is relatively simple to filter as it tends to coagulate. Filtration of $TiO_2$ precipitated from hydrochloric acid solutions has normally been extremely difficult as the precipitate is very fine.

We have observed that if the fluoride concentration is less than 13% of the titania values, filtration of the precipitate is very difficult and there is a high likelihood of discolouration of the precipitate, for example, by iron.

We have also found that the presence of the fluoride in the solution when the titania values are being precipitated effectively complexes the ferric iron values which causes a great increase in the whiteness of the precipitate due to the non-absorption of the ferric iron. The stability constant of $Fe^{3+}$ fluorides are much greater than for $Fe^{2+}$.

Alternatively, the ferric iron may be reduced by known methods. In this case, most of the fluoride is removed from the solution onto the precipitate which is a mixture of the various compounds and may be non-stoichiometric.

We have also found that the addition of iron complexers to the solution prior to precipitation give excellent results and a ready filterability. Complexers include oxalic acid and oxalates which effectively complex with the ferric iron. Other complexers may also be used.

The solid material which remained after the first digestion, may be passed to a second digester which, if required, can operate under more severe conditions than the first digester, specifically the acid may be more concentrated, although still preferably under 25% and the temperature can be maintained close to boiling point. Agitation can also be increased if necessary. It may well be that the second digester can operate under similar conditions to the first digester as the acid initially will be of greater concentration than was the case near the end of the previous digestion process and thuss a large percentge of the remaining ilmenite can be dissolved.

It may economically not be worthwhile to carry the second digestion process for a longer period of time than the first process or to have a second digestion at all as the intractible materials may well be considered useful for use in steel plants where they are very suitable for use to help the formation of slag and removal of injurious elements such as nitrogen.

Alternatively, as will be described hereinafter, this material may be sintered into balls for use as a grinding medium.

If desired, the feed stock could be passed through a magnetic separation prior to initially being fed to a digester as we have found that under certain conditions in some ores the intractible grains appear to be more magnetic than the grains which can be readily dissolved and thus they can be separated and sold or used in their initial conditions without occupying space in the digester.

If a cylindrical digester is used, we have found that it is most desirable to aid the digestion by the use of grinding or, rather, more particularly, working the surfaces of the grains to aid in the presentation of fresh surfaces to the acid. As the drum would normally be coated, as previously described, the main grinding operation would tend to be between the grinding balls rather than between the balls and the wall. It is well known in grinding techniques that there is a certain amount of attrition of the grinding media and although it would be possible, for example, to use steel balls, the material removed from the ball reacts with the acid and thus the amount of chloride available for dissolution of the titanium values would be reduced. Similarly, one must select balls which do not add colour to the material being ground and which will not inhibit any of the other reactions of the process.

It may be possible to use ceramic balls, or as previously indicated, some of the more intractible titaniferous ores could be sintered to form balls. We find that this material will readily sinter at approximately 1300° C. and of course any attrition of these balls will tend to increase the overall yield of the plant rather than decrease the yield as could well otherwise be the case.

The filter or centrifuge cake consisting mainly of titanium, oxygen and fluorine can be further treated and in one form of treatment we prefer to wash this material at relatively high temperatures with hydrochloric acid, this washing will remove much of the iron still present and other impurities but, provided the acid concentration is controlled, the required product will not be dissolved. The precipitate is, however, extremely reactive and can readily be dissolved in acids. It will also react with gases such as chlorine at relatively low temperatures, when compared with mineral rutile or rutile substitutes produced by other upgrading processes which operate at high temperatures and often at above atmospheric pressures. In order to obtain relatively pure, and up to pigment grade titanium dioxide, the material left after washing can go through a further treatment which includes the removal of the fluoride ions and the recovery of the acid. These steps will be described more fully hereinafter.

The invention is also applicable to a continuous process and one particular form of continuous process will now be described.

It will be appreciated that the actual steps and the possible alternative steps are effectively the same as those previously described in relation to the batch process although as we will describe hereinafter there can be a greater dissolution of the feed in a single digester than was economically feasible in the batch process and it is therefore less likely that a second digester need be used although if required, we can use such a digester.

The preparatory steps which may include dry grinding, surface cleaning and magnetic separation of particular parts of the feed, can be identical to those described in relation to the batch process.

The digester used in a continuous process is of the rotating drum type but with the continuous process the material can be supplemented on dissolution by the addition of further material at one end of the drum and there can be a continuous addition of acid, this acid may be added at the same end of the drum as the feed material is added but we prefer to add the acid at the other end of the drum as in this way the acid at its most concentrated period is acting upon the most intractible part of the feed and thus higher dissolution can be obtained. In any case, the fact that new acid is continually being added, we do not, in the continuous process, have the difficulty of the batch process that acid concentration diminishes with time. It is for this reason that the use of a second digester may well not be necessary. There is one advantage of using a second digester and that is that efficiency may be improved by removing material from the first digester, passing it through a separation process whereby slimes are separated from the coarser material and then passing this coarser material into a second digester. Alternatively, the separated material could be returned to the input of the first digester, preferably after known treatment to remove siliceous or similar impurities.

We may also prefer to use in the drum, a grinding media so as to continually form new surfaces on the feed and, again, this grinding media may be similar to that described in the batch process, that is it may be metal balls, although this is undesirable as they tend to affect the efficient use of the acid present. Preferably, the balls may be of a material which is not dissolved by hydrochloric acid at the temperatures of the process or they may be balls which are made by sintering material similar to the feed. Possibly, they could be intractible materials which were separated from the remainder of the feed during a magnetic separation step at the beginning of the process but other materials could be used.

The acid which passes from the digester still passes through a filtration or settlement step to enable slimes or other solid impurities to be removed therefrom. The removed solid impurities which are unreactive material can be recycled to the digester if desired but preferably they are simply collected for different treatment or, depending on their constituent, may be sold for use, for example, in the steel industry. Similarly, the small quantity of fine material produced has a high titanium content that may also be utilized.

After clarification, the acid carrying dissolved titanium tetrachloride, iron chlorides, calcium, fluoride and other material can be continuously hydrolyzed by adding this to a bath in which precipitation has already commenced as the presence of fresh precipitated titanium dioxide or, more accurately, complex salts including titanium oxy hydroxy fluoride, assists precipitation so that the titanium and most of the fluorine values are continuously precipitated.

The precipitated material may be removed from the precipitation tank as it settles therein and the acid which then has iron chlorides as the major phase in solution can be withdrawn for continuous delivery to an acid recovery plant, as will be described later. The acid from this plant may be returned to the digester, again in a continuous manner whereby the heat requirements of the digester can be minimized as the acid coming from the regeneration plant can be approximately at boiling point.

Instead of precipitating a mixture of titanium dioxide, titanium oxy fluoride and titanium oxy hydroxy fluoride by continuous feed to an area where precipitation has already occured, it could equally well be possible to effect precipitation by a partial drying of the acid at which time spontaneous precipitation will occur and by this method a high percentage of the fluoride is removed from the solution which reduces the potential for corrosion in the acid recovery plant.

As described in the batch process embodiment, the precipitated product can, if required, be treated with acid to effect dissolution of any iron oxide which is present. Each treatment must be operated under conditions which would need to be sufficient not to dissolve any substantial part of the titanium salts in the precipitate.

In describing both the batch and continuous processes, reference has been made to the subsequent treatment of the acid used in the digesters and also any acid used on the precipitate to dissolve any iron salts therein.

These acids are preferably passed to a Lurgi or other acid recovery plant, which plants are well known in industry.

The plants conventionally produce constant boiling point acids, that is acids having a concentration of approximately 20% but can be used to produce, economically, acids having concentrations slightly higher than this, say of the order of 25%. These of course are dilute hydrochloric acids.

The Lurgi process uses a fluidized bed and any iron chlorides which are in the acid when it enters the plant, precipitate onto the bed as pure ferric oxide which can be recovered and can be used as a high quality feed for various applications or can be used as a pigment. The acid obtained from the recovery plant, which is at approximately 109° C. or slightly lower, if the concentration is above constant boiling point mixture, can be returned directly to the digesters to minimize additional heat requirements in the digesters. Also, the Lurgi plants can be arranged to use waste heat to evaporate some of the water from the acid being fed to the plant and this facility can also be used to reduce the volume of the acid containing the titanium, iron and other values if the titanium is to be precipitated by the evaporation method.

If the acid being fed to the plant contains fluoride, it is possible that there will, initially, be complexes of Fe $Cl_2$, Fe $Cl_3$, Fe $F_2$ and Fe $F_3$ as well as other possibilities.

However, differences in volatility of iron chlorides as against iron fluorides may be used as a method of separation so that mainly chloride is fed to the acid regeneration plant. Yet again, with suitable modification, a small content of fluoride may cause no undue perturbation of the process with great advantages to disolution capacity of a regenerated chlor/fluoro acid. Alternatively, to remove the fluoride ions, it could be necessary to treat the material with a solution of a calcium salt or other ions which give an insoluble fluoride.

Also, in respect of each of the processes, we indicated that the precipitate was basically not a simple mixture of titanium dioxide and titanium tetrafluoride but from X-ray defraction analysis and the infra red spectra of the precipitate, it appears that amongst the major components is titanium oxy hydroxy fluoride (TiO(OH)F). This compound can be non-stoichiometric by absorption of excess $TiF_4$, amongst other materials. There are two ways in which the fluorine can be removed from the precipitate.

In the first of these, the dissolution is simply by heat and the equation for the end result where heating to 800° C. is effected, is $$2TiO(OH)F \rightarrow TiO_2 + H_2O + TiF_4$$

Titanium tetrafluoride condenses at a relatively low temperature so if the gases driven off are passed over a relatively cool surface, the titanium tetrafluoride can be collected. This can be retreated to provide titanium dioxide, other titanium salts or even titanium metal. It could also serve as a convenient method of transporting fluorine to give, by hydrolysis, hydrofluoric acid of high purity.

The reaction is in fact a two stage reaction in the first of which stages, which occurs at approximately 450° C., the titanium oxy hydroxy fluoride breaks down to titanium dioxide, titanium oxy fluoride and water and at a higher temperature any titanium oxy fluoride breaks down to titanium dioxide and titanium tetrafluoride.

The second way of removing the fluorine from the titanium oxy hydroxy fluoride is to treat this with steam, possibly at approximately 500° C. When this reaction is effected the end result is titanium dioxide and hydrogen fluoride.

Depending on the steam quantity used, it would be possible to obtain a titanium dioxide which could still have small fluoride impurities and anhydrous hydrogen fluoride which in itself is a very readily marketable commodity. Alternatively, even aqueous hydrogen fluoride is valuable.

The invention has given good results for ilmenites from Australia, New Zealand and Norway. Table IV shows dissolution results both with and without the use of fluoride on three different Norwegian and two Australian ilmenites, the tests all being for the same time (1 hour) at the same temperature (109° C) and on ground material.

For example, if the iron in the ilmenite is largely in the ferric form, it may be desirable to reduce this to the ferrous form to make it more amenable for attack by hydrochloric acid. This reduction can be done before the feed is passed to the digester, by use of known processes or alternatively, reductants could be added to the digester together with the feed and fluorite, such reductants being, for example, oxalic acid and oxalates. Such additions are to be considered part of the present invention.

Also, if the particular ilmenite is known to contain extremely intractible inclusions, it may be desirable to pass this through a magnetic separation process before feeding the material to the digester. We have found tht the intractible material can sometimes be more mag-

TABLE IV

| Locality | Concn. | Fluorite % | % Dissolved |
|---|---|---|---|
| Arendal, Norway | 25% acid | 18.56 | 65.6 |
| " | " | 0 | 26.8 |
| Kragero, Norway | " | 18.56 | 60.8 |
| " | " | 0 | 25.6 |
| Egersund, Norway | " | 18.56 | 70.8 |
| " | " | 0 | 36.4 |
| Bunbury, Australia | " | 18.56 | 58.0 |
| " | " | 0 | 18.9 |
| Jurien Bay, Australia | " | 18.56 | 33.2 |
| " | " | 0 | 16.0 |

A further set of tests have been carried out on New Zealand ilmenite, from Mercury Bay and shows various applications of the invention, in each case the weight of ilmenite used was 25 grams and the acid quantity was 250 ml. The results of these experiments are set out hereinunder in Table V.

netic than the remainder and a large percentage of the material can be removed in this way, for certain ilmenites.

Although we have described our invention as working at atmospheric pressure, there may be occasions where beneficial results may be achieved if there is a

TABLE V

| Conc. % | CaF$_2$ g | HF (40%) | Others | Time | Temp. C° | % Dissolved | % F in TiO$_2$ |
|---|---|---|---|---|---|---|---|
| 25 | 6 | — | — | 1 hr. | B.P. (109) | 81.6 | 11.2 |
| 20 | 6 | — | — | " | " | 63.2 | 12.4 |
| 25 | 6 | — | 4g oxalic | " | " | 80.0 | 7.1 |
| " | 2 | — | — | " | " | 71.2 | 6.1(6) |
| " | 4 | — | — | " | " | 76.8 | 7.1 |
| " | 8 | — | — | " | " | 81.2 | 12.9 |
| " | 1 | — | — | " | " | 67.2 | 3.9 |
| " | 1 | — | — | 1 hr. | 75–85 | 51.2 | 5.6 |
| " | 2 | — | — | " | " | 57.2 | |
| " | 2.5 | — | — | " | 85° | 62.4 | |
| " | 6 | — | — | " | B.P. | 81.6 | |
| " | 6 | — | — | " | 75–85 | 59.6 | |
| " | 6 | — | 4g SiO$_2$ | " | B.P. | 83.2 | Assuming SiO$_2$ in prec. |
| " | 6 | — | " | " | 75–85 | 54.4 | |
| " | 4 | — | — | " | " | 54.8 | |
| " | 4 | — | — | 2 hrs. | " | 62.4 | |
| " | — | 5 | — | 1 hr. | B.P. | 82.4 | |
| " | — | 5 | — | " | 80–85 | 62.8 | |
| " | — | 10 | — | " | B.P. | 89.2 | |
| " | — | 10 | — | ½ hr. | B.P. | 82.8 | |
| " | — | 10 | — | 1 hr. | 80–85 | 69.2 | |
| " | — | 15 | — | " | B.P. | 92.4 | |
| " | — | 15 | — | " | 80–85 | 76.8 | |
| " | 6 | — | — | 2 hrs. | B.P. | 81.2 | |
| " | 6 | — | — | " | 80–85 | 68.8 | |
| *20 | 6 | — | — | " | B.P. | 72.0 | |
| *20 | 6 | — | — | " | 85–90 | 55.2 | |
| 25 | — | 10 | — | " | 85° | 80.8 | |
| *20 | | 10 | — | " | 85° | 64.4 | |

*Similar volume HCl as for 25% concentration but more water added to give a 20% acid.

Whilst we have discussed both batch and continuous processes and have suggested that grinding may be used to the material before being fed to the digesters, and also that dirt could be removed from the ore surfaces, it is to be understood that other preliminary treatment processes may be used, depending on the particular form of ilmenite.

certain amount of pressure applied to the reaction vessel. We prefer to minimise such pressure as, economically it is undesirable to use pressure vessels.

Furthermore, as stated in the preamble, although emphasis has been placed in the experimental work on ilmenite and similar naturally occurring ores, the invention is applicable to a variety of artificially produced materials such as slags.

I claim:

1. A process for the beneficiation of titaniferous ores including mixing the ore with an insoluble source of fluoride ions which source becomes soluble under the following conditions of the process, the fluoride concentration relative to the titania values in the ore lying between 13% and 50% by weight and heating the mixture with dilute hydrochloric acid at a temperature not more than atmospheric boiling point to thereby dissolve a substantial part of the titanium and iron values of the ore.

2. A process as claimed in claim 1 wherein the concentration of fluoride lies between 20% and 40% by weight.

3. A process as claimed in claim 2 wherein the fluoride is calcium fluoride.

4. A process as claimed in claim 1 wherein the acid concentration lies between 20% and 25% (W/V).

5. A process as claimed in claim 4 wherein the mixture is heated to the boiling point of the acid and whilst heating is agitated.

6. A process as claimed in claim 1 wherein after dissolution the supernatent liquid is treated to precipitate the major part of the titanium values whilst leaving the iron and other values in solution.

7. A process as claimed in claim 6 wherein the volume of the liquid is reduced to such a level that spontaneous precipitation of the titanium values occurs.

8. A process as claimed in claim 6 wherein precipitation is effected by the addition of a seed or a seeding material to the liquid.

9. A process as claimed in claim 6 wherein the solution is fed to an acid recovery plant from which hydrochloric acid which has a concentration of between 20% and 25% is obtained, the acid being fed to the digester, at about the temperature at which it leaves the plant.

10. A process as claimed in claim 6 wherein the precipitate is a mixture including titanium oxy hydroxy fluoride and titanium oxy fluoride and titanium dioxide, and said titanium oxy hydroxy fluoride is heated to decompose into titanium dioxide and titanium oxy fluoride which on further heating decomposes to titanium dioxide and titanium tetrafluoride which can be condensed.

11. A process as claimed in claim 10 wherein the titanium oxy hydroxy fluoride and titanium oxy fluoride are treated with hot steam and decomposed to titanium dioxide and hydrogen fluoride.

12. A continuous process for the beneficiation of titaniferous ores as herein defined, including feeding ore and an insoluble fluoride to a rotary digester, the concentration of fluoride ions relating to the titania values in the ore lying between 13% and 50% by weight feeding hydrochloric acid having a concentration of between 20% and 25% (W/V) to the digester, heating the mixture and delivering from the digester, a liquid containing a large percentage of the titanium and iron values from the ore and solid materials which include unreacted ore, undissolved fluoride and inclusions from the core, treating and the liquid to precipitate the titanium values therefrom.

13. A process as claimed in claim 12 wherein the volume of the liquid is reduced to such a level that spontaneous precipitation of the titanium values occurs.

14. A process as claimed in claim 12 wherein precipitation is effected by the addition of a seed or a seeding material to the liquid.

15. A process as claimed in claim 12 wherein material to agitate the mixture is added to the digester.

16. A batch process for the beneficiation of titaniferous ores including adding to the ores, an insoluble fluoride which source becomes soluble under the following conditions of the process, at a fluoride ion concentration relating to the titania values lying between 13% and 50% by weight, adding hydrochloric acid having a concentration of between 20% and 25% by weight to a digester, heating the mixture, removing from the digester, a liquid containing a large percentage of the titanium and iron values from the ore and solid materials which include unreacted ore, fluoride and inclusions from the ore, and treating the liquid to selectively precipitate the titanium values therefrom.

17. A process as claimed in claim 16 wherein the value of the liquid is reduced to such a level that spontaneous precipitation of the titania values occurs.

18. A process as claimed in claim 16 wherein precipitation is effected by the addition of a seed or a seeding material to the liquid.

19. A process for the beneficiation of titaniferous ores consisting essentially of mixing the ore with an insoluble source of fluoride ions which source becomes soluble under the following conditions of the process, the concentration of said source of fluoride relative to the titania values in the ore lying between 13% and 50% by weight and heating the mixture with dilute hydrochloric acid at a temperature not more than the atmospheric boiling point to thereby dissolve a substantial part of the titanium and iron values of the ore.

* * * * *